US009447268B2

(12) United States Patent
Oohori et al.

(10) Patent No.: US 9,447,268 B2
(45) Date of Patent: Sep. 20, 2016

(54) RESIN COMPOSITION

(71) Applicants: Kyowa Chemical Industry Co., Ltd., Kagawa (JP); SEA WATER CHEMICAL INSTITUTE, INC., Fukuoka (JP)

(72) Inventors: Kohei Oohori, Kagawa (JP); Hitoshi Manabe, Kagawa (JP); Daisuke Kudo, Kagawa (JP); Shigeo Miyata, Fukuoka (JP)

(73) Assignees: KYOWA CHEMICAL INDUSTRY CO., LTD., Kagawa (JP); SEA WATER CHEMICAL INSTITUTE, INC., Fukuoka (JP)

(*) Notice: Subject to any disclaimer, the term of this patent is extended or adjusted under 35 U.S.C. 154(b) by 0 days.

(21) Appl. No.: 14/125,383

(22) PCT Filed: Apr. 5, 2013

(86) PCT No.: PCT/JP2013/060997
§ 371 (c)(1),
(2) Date: Dec. 11, 2013

(87) PCT Pub. No.: WO2013/151188
PCT Pub. Date: Oct. 10, 2013

(65) Prior Publication Data
US 2014/0128500 A1 May 8, 2014

(30) Foreign Application Priority Data
Apr. 5, 2012 (JP) .................. 2012-086011

(51) Int. Cl.
*C08K 3/30* (2006.01)
*C08L 23/12* (2006.01)
*C01F 5/22* (2006.01)
*C01F 5/40* (2006.01)
*C09C 1/02* (2006.01)
*C08K 3/22* (2006.01)
*B82Y 30/00* (2011.01)

(52) U.S. Cl.
CPC ............... *C08L 23/12* (2013.01); *C01F 5/22* (2013.01); *C01F 5/40* (2013.01); *C08K 3/22* (2013.01); *C08K 3/30* (2013.01); *C09C 1/028* (2013.01); *B82Y 30/00* (2013.01); *C01P 2004/03* (2013.01); *C01P 2004/10* (2013.01); *C01P 2004/20* (2013.01); *C01P 2004/24* (2013.01); *C01P 2004/54* (2013.01); *C01P 2004/61* (2013.01); *C01P 2006/12* (2013.01); *C08K 2003/2224* (2013.01); *C08K 2003/3063* (2013.01)

(58) Field of Classification Search
CPC ........... C08K 3/22; C08K 3/30; C08K 9/04; C08K 2003/2224; C08K 2003/3063

USPC .................................. 524/423, 436
See application file for complete search history.

(56) References Cited

U.S. PATENT DOCUMENTS

| 3,508,869 | A | | 4/1970 | Shoaff |
|---|---|---|---|---|
| 5,492,967 | A | * | 2/1996 | Djiauw ................. C08L 53/025 525/98 |
| 7,892,447 | B2 | * | 2/2011 | Maddan ................... 252/182.33 |
| 8,501,842 | B2 | * | 8/2013 | Maruyama et al. ........... 524/99 |
| 2003/0235693 | A1 | | 12/2003 | Oishi et al. |
| 2008/0169201 | A1 | | 7/2008 | Maddan |

FOREIGN PATENT DOCUMENTS

| EP | 0 544 503 | 6/1993 |
|---|---|---|
| JP | 63-218747 | 9/1988 |
| JP | 2005-105056 | 4/2005 |
| WO | 00/35808 | 6/2000 |

OTHER PUBLICATIONS

Wypych, George, Handbook of Fillers, 2nd Edition. Toronto, ChemTec Publishing, 2000, p. 106. TP1114.W96.*
International Search Report issued May 14, 2013 in International (PCT) Application No. PCT/JP2013/060997.
Search Report and Written Opinion issued Mar. 20, 2015, in corresponding Singapore Application No. 2013095013.
Wan Zhong et al., Chinese Nonmetallic Ore Industry Guide, Suppl. 2007, No. 64, pp. 92-96, Dec. 31, 2007 (with partial translation).
Yan Chaoye, Jiangsu Salt Science and Technology, vol. 3, pp. 9-10, Sep. 30, 2008 (with partial translation).
Extended European Search Report issued Oct. 19, 2015 in corresponding European Application No. 13772558.6.
Office Action issued Dec. 14, 2015 in corresponding Chinese Application No. 201380002304.5, with English translation.
"Study of the Properties of PP/MH Composites Containing Three Types of Magnesium Hydroxide", Journal of Saltlake Research, vol. 17, No. 4, Dec. 2009, with English translation of pertinent portion.

* cited by examiner

*Primary Examiner* — Vickey Nerangis
(74) *Attorney, Agent, or Firm* — Wenderoth, Lind & Ponack, L.L.P.

(57) ABSTRACT

A resin composition which overcomes the defects of needle-like basic magnesium sulfate and has good balance among mechanical strength, molding productivity and the appearance of a molded article. The resin composition comprises (i) 100 parts by weight of a resin (component A), (ii) plate-like magnesium hydroxide having a crystal thickness (y) of 0.2 μm or less, a crystal width (x) of 3.5 to 10 μm and an aspect ratio of 20 to 100 (component B) and (iii) needle-like basic magnesium sulfate (component C), wherein the total content of the components B and C is 1 to 100 parts by weight based on 100 parts by weight of the resin, and the weight ratio of the component B to the component C is 0.1 to 0.9:0.9 to 0.1.

6 Claims, 2 Drawing Sheets

×10⁴  5μm $H_B = x/y$ $H_C = L/w$

RESIN COMPOSITION

TECHNICAL FIELD

The present invention relates to a resin composition which is excellent in mechanical strength and the appearance of a product. More specifically, it relates to a resin composition which comprises two different magnesium compounds and is excellent in mechanical strength and the appearance of a molded article.

BACKGROUND ART

In recent years, energy prices have been becoming higher and higher. Therefore, energy saving is a common issue in a wide variety of fields. For example, in the field of automobiles, one of means for improving gas mileage is to reduce the weight of a car body. This is the reduction of weight by substituting a metal having a high specific gravity by a plastic having a low specific gravity. However, in order to realize this, it is necessary to overcome the weak points of a resin such as elastic modulus (stiffness), thermal deformation temperature and heat shrinkage by an excellent reinforcing agent.

To meet the above requirements, needle-like basic magnesium sulfate is becoming a promising material. The needle-like basic magnesium sulfate is a reinforcing agent which is a thin needle-like crystal in appearance and has a width (W) of 0.2 to 1 μm and a length (L) of 10 to 150 μm and whose chemical composition is represented by $MgSO_4 \cdot 5Mg(OH)_2 \cdot 3H_2O$. The needle-like basic magnesium sulfate is excellent in the strengthening of flexural modulus (stiffness) but has problems with impact strength and the smoothness of the surface of a molded article.

DISCLOSURE OF THE INVENTION

It is an object of the present invention to provide a resin composition which overcomes the defects of needle-like basic magnesium sulfate and has good balance among mechanical strength, molding productivity and the appearance of a molded article.

The inventors of the present invention found that when plate-like magnesium hydroxide (component B) and needle-like basic magnesium sulfate (component C) are used in combination with a resin (component A), mechanical strength is reinforced synergistically and the appearance of a molded article is improved and accomplished the present invention.

That is, the present invention is a resin composition comprising (i) 100 parts by weight of a resin (component A), (ii) plate-like magnesium hydroxide (component B) having a crystal thickness (y) of 0.2 μm or less and an aspect ratio of 20 to 100, and (iii) needle-like basic magnesium sulfate (component C), wherein the total content of the components B and C is 1 to 100 parts by weight based on 100 parts by weight of the resin and the weight ratio of the component B to the component C is 0.1 to 0.9:0.9 to 0.1.

BEST MODE FOR CARRYING OUT THE INVENTION

<Plate-like Magnesium Hydroxide (Component B)>

The crystal thickness (y) of the plate-like magnesium hydroxide is 0.2 μm or less, preferably 0.01 to 0.2 μm, more preferably 0.1 μm or less, much more preferably 0.06 μm or less. The width (x) of the crystal is preferably 0.5 to 10 μm, more preferably 2 to 10 μm, much more preferably 3 to 10 μm. The thickness (y) and the width (x) of the crystal are determined as the average values of 10 crystals by AFM measurement.

Figure 1:
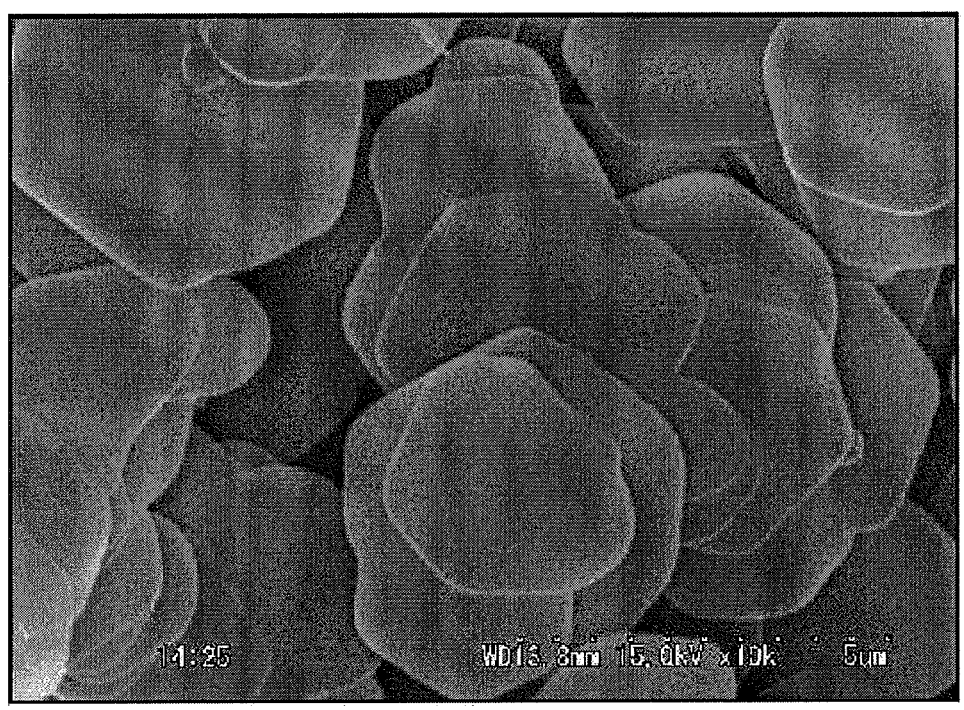
FIG. 1 shows an SEM photo of plate-like magnesium hydroxide obtained in Synthesis Example 1.
Figure 1:
Figure 2:
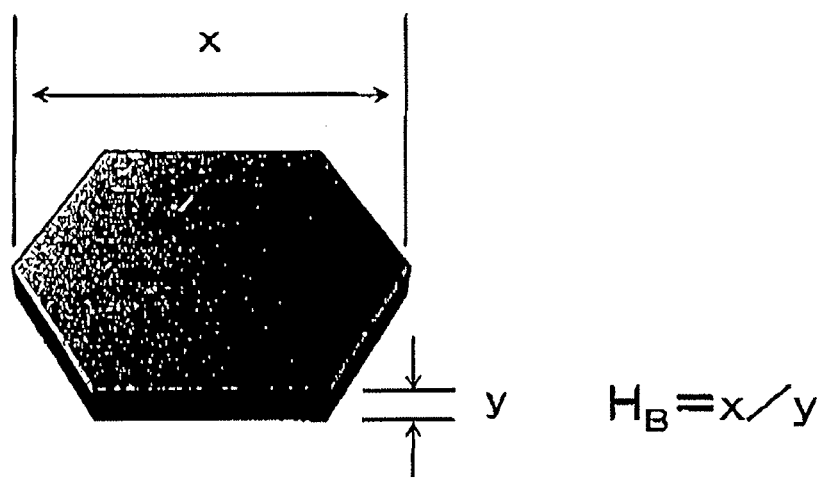
FIG. 2 shows the schematic shape of plate-like magnesium hydroxide.

The aspect ratio ($H_B$) is represented by the ratio of the width (x) to the thickness (y) of the crystal. As the aspect ratio of the plate-like magnesium hydroxide (component B) is higher, the flexural modulus tends to improve. Therefore, the aspect ratio of the plate-like magnesium hydroxide (component B) is 20 to 100. The lower limit of the aspect ratio is preferably 30 or more, more preferably 40 or more. The plate-like magnesium hydroxide (component B) is an almost hexagonal plate-like crystal. The schematic shape of the plate-like magnesium hydroxide (component B) is shown in FIG. 2.

The plate-like magnesium hydroxide (component B) is represented by the following formula.

Preferably, the plate-like magnesium hydroxide (component B) has a crystal thickness (y) of 0.2 μm or less and an aspect ratio of 30 or more. More preferably, the plate-like magnesium hydroxide (component B) has a crystal thickness (y) of 0.1 μm or less and an aspect ratio of 40 or more.

The plate-like magnesium hydroxide (component B) can be produced by a method described in the pamphlet of WO2012/050222. That is, it can be produced by adding not more than one equivalent of an alkali to an aqueous solution of a salt of a monovalent acid and magnesium in the coexistence of an monovalent organic acid or an alkali metal salt thereof to carry out a coprecipitation reaction and then hydrothermally processing the coprecipitated product at 100 to 250° C.

Examples of the salt of a monovalent acid and magnesium include magnesium chloride and magnesium nitrate.

Examples of the alkali include alkali metal hydroxide, calcium hydroxide and ammonia. The amount of the alkali is preferably 0.5 to 1.0 equivalent, more preferably 0.6 to 0.8 equivalent based on 1 equivalent of magnesium chloride.

Examples of the monovalent organic acid include acetic acid, propionic acid and butyric acid. The amount of the monovalent organic acid is preferably 10 to 200 mol %, more preferably 50 to 100 mol % based on magnesium chloride.

Examples of the alkali metal of the monovalent organic acid include sodium acetate, sodium propionate and sodium butyrate. The amount of the alkali metal of the monovalent organic acid is preferably 10 to 200 mol %, more preferably 30 to 100 mol % based on magnesium chloride.

The hydrothermal processing is carried out at 100 to 250° C., preferably 120 to 200° C., for 20 minutes to 48 hours, preferably 2 to 12 hours.

The monovalent organic acid or the alkali metal salt thereof may be added before the hydrothermal processing after the coprecipitation reaction. After the hydrothermal processing, commonly used steps such as filtration, rinsing, surface treatment, dehydration, granulation, drying, grinding and classification may be suitably selected and carried out.

<Needle-like Basic Magnesium Sulfate (Component C)>

The chemical composition of the needle-like basic magnesium sulfate (component C) is represented by the following formula.

$$MgSO_4 \cdot 5Mg(OH)_2 \cdot 3H_2O$$

The needle-like basic magnesium sulfate (component C) is a needle-like crystal.

The width (W) of the needle-like basic magnesium sulfate (component C) is preferably 0.2 to 1 μm, more preferably 0.5 to 1 μm.

The length (L) thereof is preferably 10 to 100 μm, more preferably 20 to 50 μm, much more preferably 10 to 50 μm. The aspect ratio ($H_c$) (length (L)/width (w)) is preferably 20 or more, more preferably 30 to 100. Preferably, the crystals do not agglomerate and are almost monodisperse.

Figure 3:
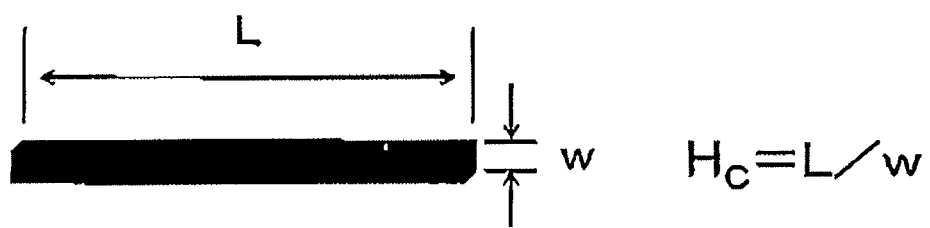
FIG. 3 shows the schematic shape of needle-like basic magnesium sulfate.

The schematic shape of the needle-like basic magnesium sulfate (component C) is shown in FIG. 3.

Preferably, the needle-like basic magnesium sulfate (component C) has a width (w) of 0.5 to 1 μm, a length (L) of 20 to 50 μm and an aspect ratio of 20 or more.

The needle-like basic magnesium sulfate (component C) can be produced by adding an alkali such as magnesium hydroxide, magnesium oxide or alkali hydroxide in an amount of less than 5 times the molar amount of magnesium sulfate to an aqueous solution of magnesium sulfate and carrying out hydrothermal processing at 120 to 250° C. for 1 to 10 hours. The amount of the alkali is preferably 0.1 to 5 moles, more preferably 1 to 3 moles based on 1 mole of magnesium sulfate.

The temperature of the hydrothermal processing is preferably 120 to 250° C., more preferably 150 to 190° C. The time of the hydrothermal processing is preferably 1 to 10 hours, more preferably 4 to 8 hours.

The total content of the components B and C is 1 to 100 parts by weight, preferably 1 to 70 parts by weight, more preferably 1 to 50 parts by weight based on 100 parts by weight of the resin.

The weight ratio of the plate-like magnesium hydroxide (component B) to the needle-like basic magnesium sulfate (component C) used in the present invention is 0.1 to 0.9:0.9 to 0.1, preferably 0.2 to 0.6:0.8 to 0.4.

Although the plate-like magnesium hydroxide (component B) and the needle-like basic magnesium sulfate (component C) used in the present invention may be used as they are, they may be surface treated with an anionic surfactant, silane-based coupling agent, titanate-based coupling agent, aluminum-based coupling agent, phosphoric acid ester or metal fatty acid before use. The amount of the surface treating agent is 0.1 to 10 wt %, preferably 0.5 to 5 wt % based on the component B or the component C. The surface treatment may be carried out by a commonly used wet process or dry process.

Further, the above reinforcing agent may be granulated by a commonly used method before use. When it is granulated, its bulkiness becomes close to that of the resin, thereby improving kneading work efficiency and kneadability with the resin.

<Resin (Component A)>

The resin (component A) used in the present invention is at least one selected from the group consisting of thermoplastic resins, thermosetting resins and rubbers. Examples of the resin include thermoplastic resins such as polyethylene, ethylene-α-olefin copolymer, ethylene-vinyl acetate copolymer, ethylene-ethyl acrylate copolymer, ethylene-methyl acrylate copolymer, copolymer of polypropylene or propylene and another α-olefin, polybutene-1, poly4-methylpentene-1, polystyrene, styrene-acrylonitrile copolymer, copolymer of ethylene and propylene diene rubber or butadiene, polyvinyl acetate, polyvinyl alcohol, polyacrylate, polymethacrylate, polyurethane, polyester, polyether, polyamide, ABS, polycarbonate and polyphenylene sulfide.

Thermosetting resins such as phenol resin, melamine resin, epoxy resin, unsaturated polyester resin and alkyd resin are also included.

EPDM, SBR, NBR and copolymer rubber of ethylene and another α-olefin such as propylene or octene are further included. Butyl rubber, chloroprene rubber, isoprene rubber, chlorosulfonated rubber, silicon rubber, fluorine rubber, chlorinated butyl rubber, brominated butyl rubber, epichlorohydrin rubber and chlorinated polyethylene rubber are still further included.

<Other Components>

The resin composition of the present invention may contain a reinforcing agent such as talc or mica in addition to the components A to C. The content of the reinforcing agent is 1 to 50 parts by weight based on 100 parts by weight of the resin (component A).

Other commonly used resin additives such as antioxidant, ultraviolet absorbent, lubricant, crystal nucleating agent, pigment, flame retardant and filler may be selected and contained in addition to the reinforcing agent. The contents of the antioxidant, ultraviolet absorbent, crystal nucleating agent and pigment are each preferably 0.01 to 5 parts by weight based on 100 parts by weight of the resin (component A). The content of the lubricant is preferably 0.1 to 5 parts by weight based on 100 parts by weight of the resin (component A). The contents of the flame retardant and filler are each preferably 1 to 50 parts by weight based on 100 parts by weight of the resin (component A).

EXAMPLES

The following examples are provided for the purpose of further illustrating the present invention but are in no way to be taken as limiting.

Synthesis Example 1

Production of Plate-like Magnesium Hydroxide (Component B)

16 L of a sodium hydroxide aqueous solution which is an extra pure reagent having a concentration of 4 moles/L (30° C.) was added to and reacted with 20 L of a mixed aqueous solution of magnesium chloride and sodium acetate (Mg=2 moles/L, sodium acetate=2 moles/L, 30° C.) which is an extra pure reagent under agitation. This reaction product was put into an autoclave having a capacity of 50 L and hydrothermally processed at 160° C. for 5 hours. The hydrothermally processed product was taken out, filtered under reduced pressure and rinsed, and the filter cake was dispersed in water by a stirrer.

After heating at 80° C., 40 g of stearic acid (purity of 90%) was neutralized with caustic soda, and 1 L of an aqueous solution dissolved by heating was added to this under agitation to carry out a surface treatment. Thereafter, filtration under reduced pressure, rinsing, extrusion granulation and drying were carried out. Part of the specimen before the surface treatment was sampled to carry out X-ray diffraction, AFM and BET measurement by a liquid nitrogen adsorption method.

As a result of X-ray diffraction, the obtained product was identified as magnesium hydroxide. As a result of AFM measurement, each crystal was almost like a hexagonal plate in appearance and had a thickness (y) of 0.07 μm and a width (x) of 3.5 μm. Therefore, its aspect ratio was 50. The BET specific surface area was 12 m$^2$/g. This is designated as B-1.

Synthesis Example 2

Production of Plate-like Magnesium Hydroxide (Component B)

120 mL of a sodium hydroxide aqueous solution having a concentration of 4 moles/L (30° C.) was added to and reacted with 400 mL of a mixed aqueous solution of magnesium chloride and sodium acetate (Mg=4 moles/L, sodium acetate=2 moles/L, 30° C.) under agitation. This reaction product was put into an autoclave having a capacity of 1 L and hydrothermally processed at 170° C. for 4 hours. The hydrothermally processed product was taken out, filtered under reduced pressure and rinsed, and the filter cake was dispersed in water under agitation. After heating at 80° C., 1 g of stearic acid (purity of 90%) was neutralized with caustic soda, and 50 mL of an aqueous solution dissolved by heating was added to this under agitation to carry out a surface treatment. Thereafter, filtration under reduced pressure, rinsing, extrusion granulation and drying were carried out. Part of the specimen before the surface treatment was sampled to carry out X-ray diffraction, AFM and BET measurement by the liquid nitrogen adsorption method.

As a result of X-ray diffraction, the obtained product was identified as magnesium hydroxide. As a result of AFM measurement, each crystal was almost like a hexagonal plate in appearance and had a thickness (y) of 0.055 μm and a width (x) of 3.85 μm. Therefore, its aspect ratio was 70. The BET specific surface area was 7.8 m$^2$/g. This is designated as B-2.

Synthesis Example 3

Production of Needle-like Basic Magnesium Sulfate (Component C)

2 moles of magnesium hydroxide (Kisuma 5 of Kyowa Chemical Industry Co., Ltd.) was added to and mixed with 30 L of a magnesium sulfate aqueous solution (1 mole/L, 30° C.) which is an extra pure reagent by means of a stirrer, and this reaction product was put into an autoclave having a capacity of 50 L and hydrothermally processed at 180° C. for 10 hours. This processed product was filtered under reduced pressure, rinsed, dispersed in water and heated at 80° C., 4 g of stearic acid (purity of 90%) was neutralized with caustic soda, and an aqueous solution dissolved by heating was added to this under agitation to carry out a surface treatment. Thereafter, filtration under reduced pressure, extrusion granulation and drying were carried out. Part of the specimen before the surface treatment was sampled to carry out X-ray diffraction and AFM measurement.

As a result of X-ray diffraction, the obtained product was identified as a crystal having composition represented by the following formula. As a result of AFM measurement, each crystal was needle-like in appearance and had a diameter of 0.8 μm and a long diameter of 40 μm. Therefore, its aspect ratio was 50.

$$MgSO_4 \cdot 5Mg(OH)_2 \cdot 3H_2O$$

Example 1

After the plate-like magnesium hydroxide B-1 (component B) obtained in Synthesis Example 1 and the needle-like basic magnesium sulfate (component C) obtained in Synthesis Example 3 were mixed together in accordance with the following formulation, the mixture was melt kneaded together at 230° C. by using a double-screw extruder to prepare a pellet. The obtained pellet was used to produce a test sample at 230° C. by means of an injection molding machine and measure its physical properties. The results are shown in Table 1.

Based on 100 parts by weight of the total of 64.9 wt % of polypropylene (melt flow index of 110 g/10 min) and 20 wt % of EO rubber (ethylene-octene copolymer rubber), 3.5 parts by weight of the plate-like magnesium hydroxide (component B), 14.1 parts by weight of the needle-like basic magnesium sulfate (component C). (total content of the components B and C is 17.7 parts by weight) and 0.12 part by weight of an antioxidant were used.

Example 2

A resin composition was produced and evaluated in the same manner as in Example 1 except that the weight ratio of the component B to the component C was changed to 0.4:0.6. The results are shown in Table 1.

Example 3

A resin composition was produced and evaluated in the same manner as in Example 1 except that the weight ratio of the component B to the component C was changed to 0.6:0.4. The results are shown in Table 1.

Comparative Examples 1, 2 and 3

Physical properties obtained when the plate-like magnesium hydroxide B-1 (component B) obtained in Synthesis Example 1, needle-like basic magnesium sulfate (component C) and talc (average secondary particle diameter of 6.9 μm, BET of 8 m$^2$/g) were used alone (Comparative Examples 1, 2 and 3, respectively) are shown in Table 1.

MFR means melt flow index which is an index of moldability (molding rate). As this value becomes larger, the molding rate tends to become higher.

It is understood from the results of Table 1 that, when the plate-like magnesium hydroxide (component B) and the needle-like basic magnesium sulfate (component C) are used in combination, Izod impact strength and the surface roughness (poor appearance) of a molded article which are the defects of the needle-like basic magnesium sulfate (component C) are resolved and there is a mixing area where the flexural modulus which is the feature of the needle-like basic magnesium sulfate (component C) becomes higher than the flexural modulus when the needle-like basic magnesium sulfate (component C) is used alone. Therefore, a synergetic effect is obtained by using a combination of these materials.

TABLE 1

| Examples | Type and weight ratio of reinforcing agent | Flexural modulus (MPa) | MFR (g/10 min) | Izod impact strength (−20° C.) (kJ/m²) | Appearance of molded article |
|---|---|---|---|---|---|
| Ex. 1 | B/C = 0.2/0.8 | 2860 | 42 | 6 | Good |
| Ex. 2 | B/C = 0.4/0.6 | 2820 | 44 | 6 | Good |
| Ex. 3 | B/C = 0.6/0.4 | 2590 | 46 | 7 | Good |
| C. Ex. 1 | B | 2474 | 49 | 8 | Lustrous |
| C. Ex. 2 | C | 2690 | 38 | 4 | Poor |
| C. Ex. 3 | talc | 1438 | 35 | 6 | a little poor |
| Control | none (0%) | 940 | 75 | 5 | Good |

Example 4

The plate-like magnesium hydroxide B-2 (component B) obtained in Synthesis Example 2 and the needle-like basic magnesium sulfate (component C) obtained Synthesis Example 3 were kneaded with talc which is widely used as a resin reinforcing agent. A test sample was prepared in the same manner as in Examples 1, 2 and 3. The results are shown in Table 2.

Based on 100 parts by weight of the total of 64.9 wt % of polypropylene (melt flow index of 110 g/10 min) and 20 wt% of EO rubber (ethylene-octene copolymer rubber), 11.8 parts by weight of talc, 1.2 parts by weight of the plate-like magnesium hydroxide B-2 (component B), 4.7 parts by weight of the needle-like basic magnesium sulfate (component C) (total of the components B and C: 5.9 parts by weight) and 0.12 part by weight of an antioxidant were used.

Example 5

A resin composition was produced and evaluated in the same manner as in Example 4 except that the weight ratio of the component B to the component C was changed to 0.4:0.6. The results are shown in Table 2.

Comparative Examples 4 and 5

Physical properties obtained when the plate-like magnesium hydroxide B-2 (component B) obtained in Synthesis Example 2 and the needle-like basic magnesium sulfate (component C) were each used in combination with talc (Comparative Examples 4 and 5, respectively) are shown in Table 2.

It is understood from the results of Table 2 that a synergetic effect is obtained for the mechanical strength of the resin composition comprising talc by using a combination of the plate-like magnesium hydroxide (component B) and the needle-like basic magnesium sulfate (component C).

TABLE 2

| Example | Type and weight ratio of reinforcing agent | Flexural modulus (MPa) | MFR (g/10 min) | Izod impact strength (−20° C.) (kJ/m²) |
|---|---|---|---|---|
| Ex. 4 | B/C = 0.2/0.8 | 1973 | 79 | 19 |
| Ex. 5 | B/C = 0.4/0.6 | 1900 | 51 | 24 |
| C. Ex. 4 | B | 1804 | 59 | 31 |
| C. Ex. 5 | C | 1878 | 49 | 14 |
| Control | none (0%) | 940 | 75 | 5 |

EFFECT OF THE INVENTION

The resin composition of the present invention is excellent in mechanical strength such as flexural modulus and impact strength. The resin composition of the present invention is also excellent in molding productivity and the appearance of a molded article. According to the present invention, the deterioration of impact strength and the surface unevenness (roughness) of a molded product which are the defects of needle-like basic magnesium sulfate (component C) are resolved by using plate-like magnesium hydroxide (component B) in combination with the needle-like basic magnesium sulfate (component C). Further, according to the present invention, an excellent flexural modulus which is the feature of the needle-like basic magnesium sulfate (component C) is synergistically improved by using the plate-like magnesium hydroxide (component B) in combination with the component C as compared with when the component C is used alone. Therefore, a new option is created to reduce the amount of a reinforcing agent. In other words, there can be provided a resin composition which is lighter in weight than a resin composition obtained by using the needle-like basic magnesium Sulfate (component C) alone.

The invention claimed is:

1. A resin composition comprising
   (i) 100 parts by weight of a resin (component A),
   (ii) plate-like magnesium hydroxide having a crystal thickness (y) of 0.2 μm or less, a crystal width (x) of 3.5 to 10 μm and an aspect ratio of 20 to 100 (component B),
   (iii) needle-like basic magnesium sulfate (component C), and
   (iv) at least one reinforcing agent (component D) selected from the group consisting of talc and mica,
      wherein the total content of the components B and C is 1 to 100 parts by weight based on 100 parts by weight of the resin (component A), the weight ratio of the component B to the component C is 0.1 to 0.9:0.9 to 0.1, and the content of the reinforcing agent (component D) is 1 to 50 parts by weight based on 100 parts by weight of the resin (component A).

2. The resin composition according to claim 1, wherein the weight ratio of the component B to the component C is 0.2 to 0.6:0.8 to 0.4.

3. The resin composition according to claim 1, wherein the component B has a crystal thickness (y) of 0.2 μm or less and an aspect ratio of 30 to 100.

4. The resin composition according to claim 1, wherein the component B has a crystal thickness (y) of 0.1 μm or less and an aspect ratio of 40 to 100.

5. The resin composition according to claim 1, wherein the component B and the component C are surface treated with an anionic surfactant.

6. The resin composition according to claim 1, wherein the component C has a width (w) of 0.5 to 1 μm, a length (L) of 20 to 50 μm and an aspect ratio of 20 or more.

\* \* \* \* \*